United States Patent [19]
White et al.

[11] Patent Number: 5,957,347
[45] Date of Patent: Sep. 28, 1999

[54] WRIST BAND FOR POTABLE LIQUIDS

[76] Inventors: Gwendolyn L. White, 520 Poppyfields, Altadena, Calif. 91001; John L. Kennedy, 26100 Narbonne St., #43, Lomita, Calif. 90717; Wes W. Kennedy; Signe Q. Kennedy, both of 525 Meridian Ave., So. Pasadena, Calif. 91030

[21] Appl. No.: 08/688,149

[22] Filed: Jul. 29, 1996

[51] Int. Cl.⁶ .................................. A45F 3/16; A45F 5/00
[52] U.S. Cl. ...................... 224/148.1; 224/219; 224/222; 222/175
[58] Field of Search ............................... 224/148.1, 148.2, 224/148.3, 148.4, 148.5, 148.6, 148.7, 219, 222; 222/175, 215; 128/202.15; 441/56, 59; 220/703, 720, 723, DIG. 7, DIG. 13, DIG. 14; 606/202; 63/3

[56] References Cited

U.S. PATENT DOCUMENTS

| | | | |
|---|---|---|---|
| 4,736,876 | 4/1988 | Kriss | 224/148.1 |
| 4,768,688 | 9/1988 | Harrigan | 222/215 |
| 4,988,097 | 1/1991 | Smith et al. | 224/148 |
| 5,072,935 | 12/1991 | McWain | 224/148.1 |
| 5,566,869 | 10/1996 | Katz | 224/148.5 |

*Primary Examiner*—Henry J. Recla
*Assistant Examiner*—Timothy L. Maust
*Attorney, Agent, or Firm*—Frank Frisenda

[57] ABSTRACT

An improved wrist band for potable liquids is provided, the wrist band comprising an annular elastic container for maintaining a potable fluid such as a sports drink, ingestible medicine or the like to be worn on the wrist, for instance during jogging. In a presently preferred embodiment, the unique flexible annular container may further comprise an integral nipple element for the contained liquid to be dispensed from the container. Accordingly, in this embodied form the nipple closure is disposed at a mid-section on the outer wall of the annular container at a location to permit easy access to the mouth of the wearer. The material for fabricating the unique wrist band may be selected from non-toxic water proof materials, having sufficient elongation to break characteristics so that the inventive container may be easily slipped on the wrist over the hand of the user but when once positioned cannot be easily displaced except by purposeful exertion. The present invention thus provides a convenient, quick fluid dispensing device for a wide variety of users including those who are sports oriented as well as for the elderly and infirmed.

4 Claims, 4 Drawing Sheets

WRIST BAND FOR POTABLE LIQUIDS

BACKGROUND OF THE INVENTION

The present invention relates to a unique wristlet beverage container and more particularly, to an improved beverage container preferably fabricated from an elastermic water proof material for holding potable liquids such as sports drink or liquid medication in a convenient readily accessible locale.

U.S. Pat. No. 2,127,926 discloses a wristlet device to be worn for instance, during certain games such as tennis to prevent the flow of perspiration from the arm into the palm of the hand of the wearer. In one embodiment, the wristlet shown consists of a relatively wide and thick band of flexible porous sponge rubber. As stated, the sponge rubber is capable of readily absorbing liquids and is a material from which liquids may be expelled by compression of the same. Although recognizing the virtues of convenient accessibility of a wearer's wrist for the disclosed device, the invention of Mason is designed to absorb liquids rather than to dispense liquids through the use of a elastic beverage container.

Kennedy, in U.S. Pat. No. 2,604,629, discloses a wrist band accessory for gloves. A stated object of the Kennedy invention is to provide an ornamental, elastic, fabric wrist band of decorative construction which may be worn in association with gloves to enhance the appearance of the wearer.

Cabernoch in U.S. Pat. No. 4,640,425 discloses a one-piece nursing container with means for storing nipple fabricated from a single web of flexible material. As stated, the container maintains the liquid and an attached nipple or other access assembly is provided in a sterile condition until use. Cabernoch recognizes the benefits of utilizing a pre-filled, pre-sterilized disposable container for routine feedings in hospitals and other institutional environments. For instance, the use of such containers is stated to avoid the time and effort necessary for bottle preparation, clean-up, washing and sterilization. The nursing containers disclosed in the Cabernoch patent, however, must be separately carried by the user which would generally interfere with various sporting activities such as tennis, jogging, racquetball, etc.

Seward, in U.S. Pat. No. 4,818,544 discloses a system for obtaining beverages from sealed sachets containing a product containing a beverage when mixed with water for example, ground coffee or tea. In one embodied form, the Seward containers comprise an improved beverage sachets wherein the lands generally provide a more consistent and better opening of a sachet when used.

Other known wrist apparel inventions are disclosed in U.S. Pat. No. 4,067,063, inventor Donald Ettinger; U.S. Pat. No. 1,534,208, inventor Delsworth E. Gibson; U.S. Pat. No. 5,305,470, inventor William D. McKay; U.S. Pat. No. 5,119,513, inventor William D. McKay; U.S. Pat. No. 4,517,685, inventor Gary M. Lesley; and U.S. Pat. No. 4,462,116, inventor Salvatore J. Sanzome and Donald Krost.

Other improved packages for beverages and the like are disclosed in U.S. Pat. No. 5,203,459, inventor Leslie Wade; U.S. Pat. No. 4,803,205, inventor John Hammond and Leonard Reed; U.S. Pat. No. 4,765,514, inventor Albert I. Berglund.

Accordingly, those skilled in the art have recognized a significant need for more convenient beverage containers which will provide the user with a simple effective device for providing a wide variety of potable liquids in a convenient manner. The present invention fulfills these needs.

SUMMARY OF THE INVENTION

An improved wrist band for potable liquids is provided, the wrist band comprising an annular elastic container for maintaining a potable fluid such as a sports drink, ingestible medicine or the like to be worn on the wrist, for instance during jogging. In a presently preferred embodiment, the unique flexible annular container may further comprise an integral frusto-conical nipple element for the contained liquid to be dispensed from the container and optionally re-sealed. Accordingly, in this embodied form the nipple closure is disposed on the outer wall of the annular container at a mid-point location of the annual container to permit easy access to the mouth of the wearer. The material for fabricating the unique wrist band may be selected from non-toxic water proof materials, having sufficient elongation to break characteristics so that the inventive container may be easily slipped on the wrist over the hand of the user but when once positioned cannot be easily displaced except by purposeful exertion. The present invention thus provides a convenient, quick fluid dispensing device for a wide variety of users including those who are sports oriented as well as for the elderly and infirmed.

Accordingly, those skilled in the art have recognized a significant need for more convenient beverage containers which will provide the user with a simple effective device for providing a wide variety of potable liquids in a convenient manner. The present invention fulfills these needs.

BRIEF DESCRIPTION OF THE DRAWINGS

FIGS. 5b and 5c are enlarged front cross-sectional front views of the embodied closure shown in FIG. 5a.

DETAILED DESCRIPTION OF THE PREFERRED EMBODIMENTS

The present invention relates to a unique wristlet beverage container and more particularly, to an improved beverage container preferably fabricated from an elastermic water proof material for holding potable liquids such as sports drink or liquid medication in a convenient, readily accessible locale.

Figure 1:
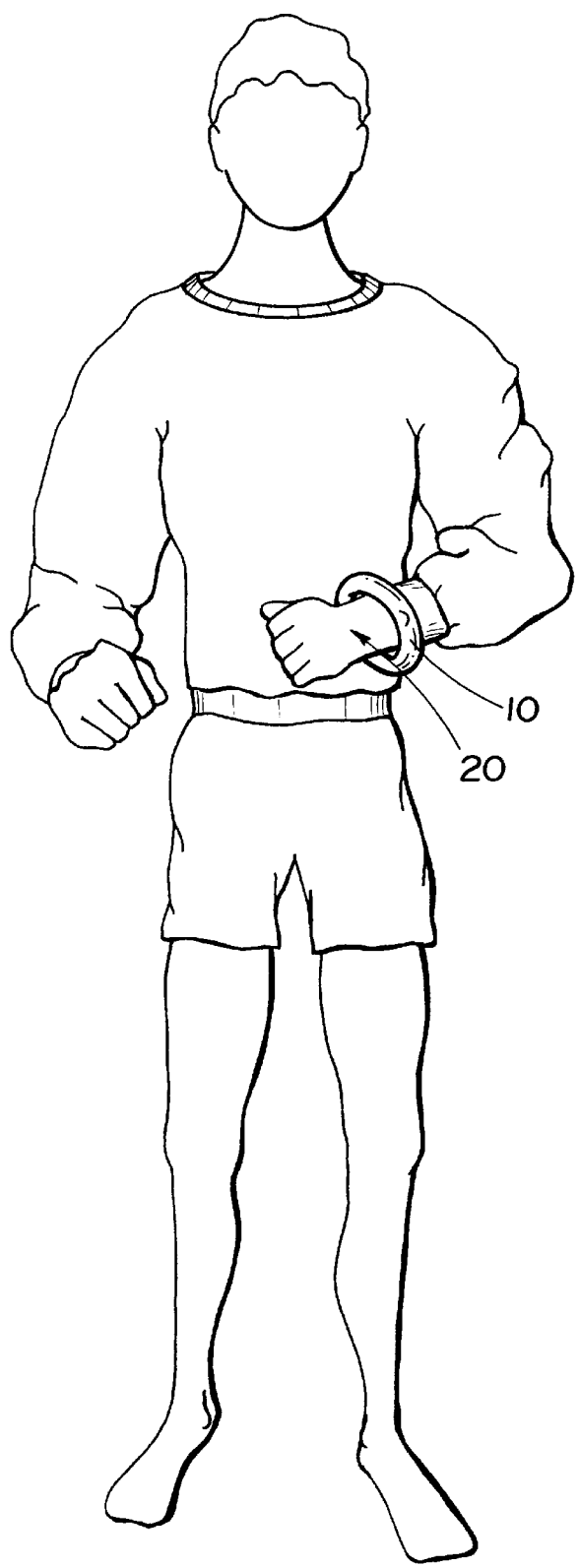
FIG. 1 is a front perspective view of the unique improved wrist band for potable liquids in accordance with one embodied form of the present invention being worn by a user.

FIG. 1 illustrates an improved wrist band 10 for potable liquids, the wrist band 10 comprising an annular elastic container for maintaining a potable fluid such as a sports drink, ingestible medicine or the like to be worn on the wrist 20, for instance during jogging. In a presently preferred embodiment, shown most clearly in FIGS. 2, 3, and 5 the unique flexible annular container may further comprise an integral nipple element 16 for the contained liquid to be dispensed from the container. Accordingly, in this embodied form the nipple closure 16 is disposed at a mid-section on the outer wall 10A of the annular container 10 at a location to permit easy access to the mouth of the wearer. The material for fabricating the unique wrist band may be selected from non-toxic water proof materials, having sufficient elongation to break characteristics so that the inventive container may be easily slipped on the wrist over the hand of the user but when once positioned cannot be easily displaced except by purposeful exertion. The present invention thus provides a convenient, quick fluid dispensing device for a wide variety of users including those who are sports oriented as well as for the elderly and infirmed.

Thus, those skilled in the art have recognized a significant need for more convenient beverage containers which will provide the user with a simple effective device for providing a wide variety of potable liquids in a convenient manner. The present invention fulfills these needs.

In more detail, and as shown in FIG. 1, the improved wrist band 10 for potable liquids may be easily slipped on the wrist of the wearer 20 over the hand, but once positioned cannot be easily displaced except by purposeful exertion.

Typically, the wrist band 10 will be fabricated from stretchable inert plastic materials such as rubber, polymers and copolymers, having sufficient elongation to break characteristics and liquid impermeability to permit the wrist band to be stretched over the hand, but once in position, to maintain a snug placement on the wrist of the wearer. The materials for fabricating the inventive wrist band must also be non-toxic and is preferably bio-degradable.

Figure 2:
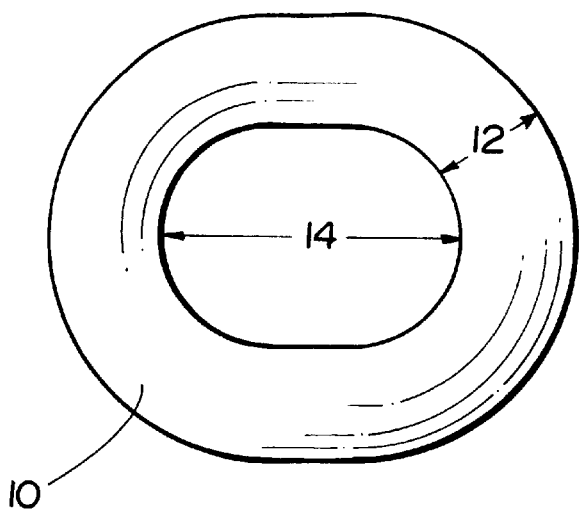
FIG. 2 is a top view if the unique wrist band for potable liquids in accordance with one embodied form of the present invention.
Figure 3:
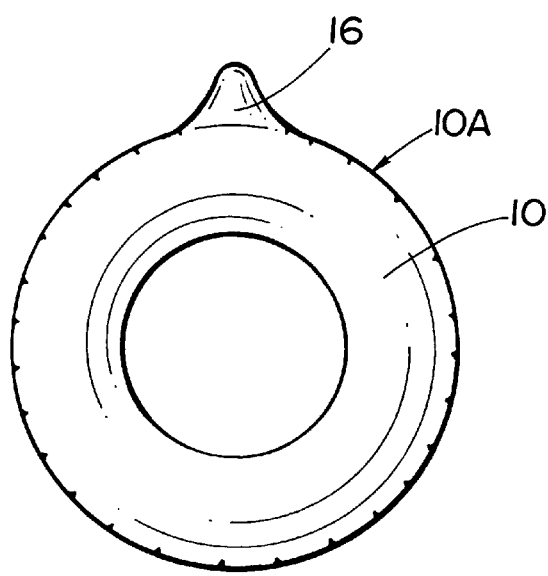
FIG. 3 is a top view of a presently preferred embodiment of the wrist band for potable liquids in accordance with the present invention depicting a nipple in a distended condition.

Referring to FIG. 2, the inventive wrist band 10 will have a preferred annulus diameter 12 of from one to two inches when positioned on the wrist of a wearer and preferably provide an inner space 14 of from two to three inches. The band may contain any suitable potable liquids, such as for instance, a sports drink, e.g., Gatorade, mineral water, ingestible medicines and the like. While the preferred closure element disposed on the band is a nipple, such as disclosed in U.S. Pat. Nos. 4,818,544 and 4,830,205, dispensing of the fluid from the band may be accomplished by other means, such as by re-sealable foil tab or with a straw. As shown in FIG. 3, preferably, the closure means 16 will be disposed on the outer wall 10A of the annular device 10 in the position of a wearer's wrist-watch.

The wrist band 10 will preferably contain four to six fluid ounces of the desired liquid. Thus, the inventive band is a convenient means to provide refreshment to the sports enthusiast but can also provide essential medication for the infirmed or elderly.

Figure 4:
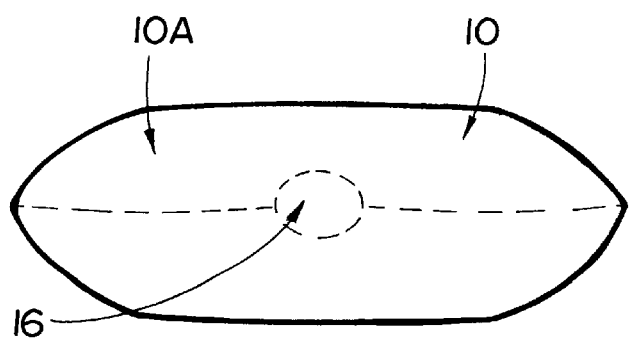
FIG. 4 is cross-sectional view of one embodied form of the wrist band for portable liquids in accordance with the present invention.

FIG. 4 depicts the inventive wristband 10 in cross-sectional view illustrating the preferred locale for the closure means 16 centrally located along the outer wall 10A of the annulus.

Figure 5A:
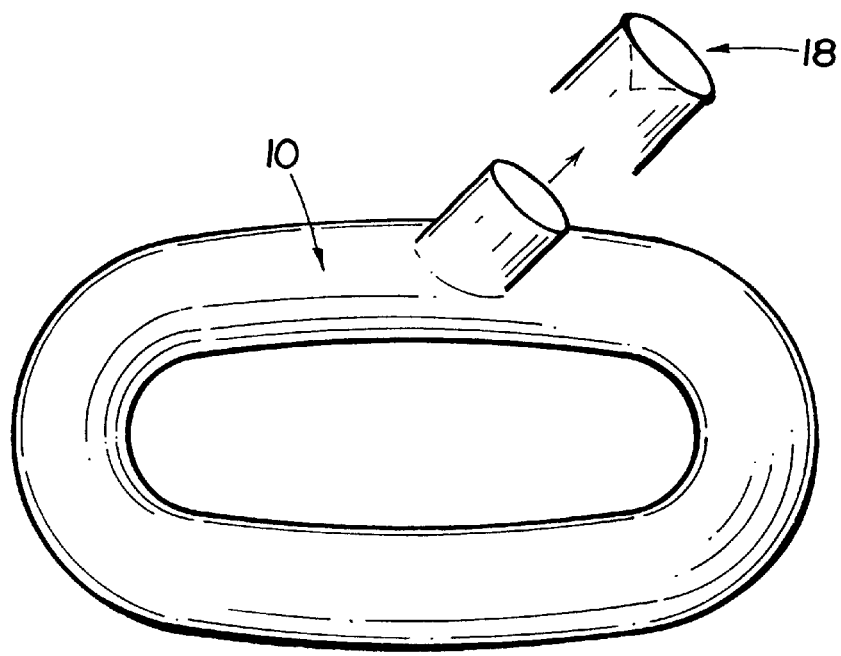
FIG. 5a is an enlarged view of one embodied closure for the improved wrist band for potable liquids in accordance with the present invention.

FIG. 5a is an enlarged view of one embodied closure comprising a removable nipple cap 18 disposed on an outer wall of the wrist band 10 for potable liquids in accordance with the present invention.

Figures 5B, 5C:
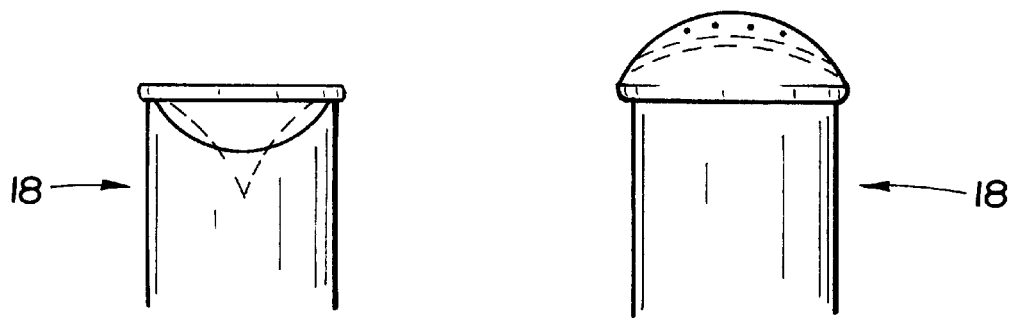

FIGS. 5b and 5c are enlarged front cross-sectional front views of the embodied removable nipple cap closure shown in FIG. 5a in a collapsed and distended position.

Figure 6:
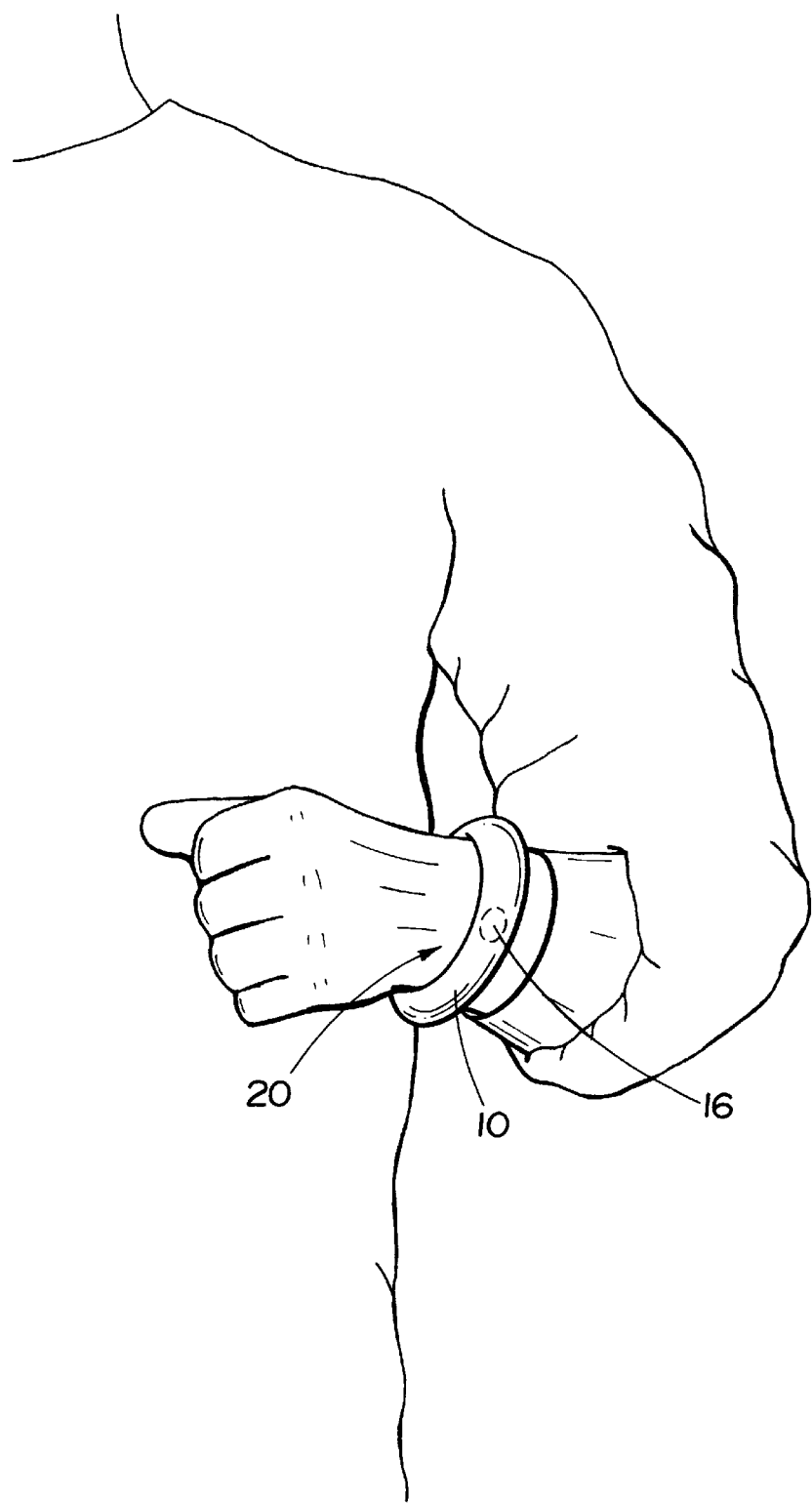
FIG. 6 is a perspective view of the arm of a wearer showing the improved wrist band being worn in a suitable position.

FIG. 6 is a perspective view of the arm of a wearer showing the improved wrist band being worn in a suitable position.

Accordingly, an inventive single or multiple piece "mini-inner tube" is provided having an integral suction device (nipple) providing means for dispensing the fluid contained within the wrist band. The band may either be reusable or disposable and can also provide a suitable substrate for indicia, such as advertising and/or directions for use.

Thus, those skilled in the art have recognized a significant need for more convenient beverage containers which will provide the user with a simple effective device for providing a wide variety of potable liquids in a convenient manner. The present invention fulfills these needs.

We claim:

1. An improved wrist band of single piece construction for potable liquids, said wrist band comprising a substantially continuous annular elastic container for maintaining a potable liquid worn on the wrist; said elastic container being fabricated from a stretchable resilient, polymeric material having sufficient elongation to break, to permit said elastic container to be easily slipped on the wrist, over the hand of a wearer, but when once positioned cannot easily be displaced except by purposeful exertion; a resealable closure means disposed on the annular container for dispensing the liquid from the container; said closure being disposed on the outer wall of the annular elastic container at a midpoint location to permit easy wrist access to the mouth of the wearer.

2. The improved wrist band as defined in claim 1, wherein the fluid contained is a medication.

3. The improved wrist band as defined in claim 1, wherein the fluid contained is a sports drink.

4. The improved wrist band as defined in claim 1, wherein the fluid contained is mineral water.

* * * * *